B. WIELER, A. BEULIGMANN & J. AYRES.
TRANSPLANTER.
APPLICATION FILED APR. 9, 1909.
981,509.
Patented Jan. 10, 1911.
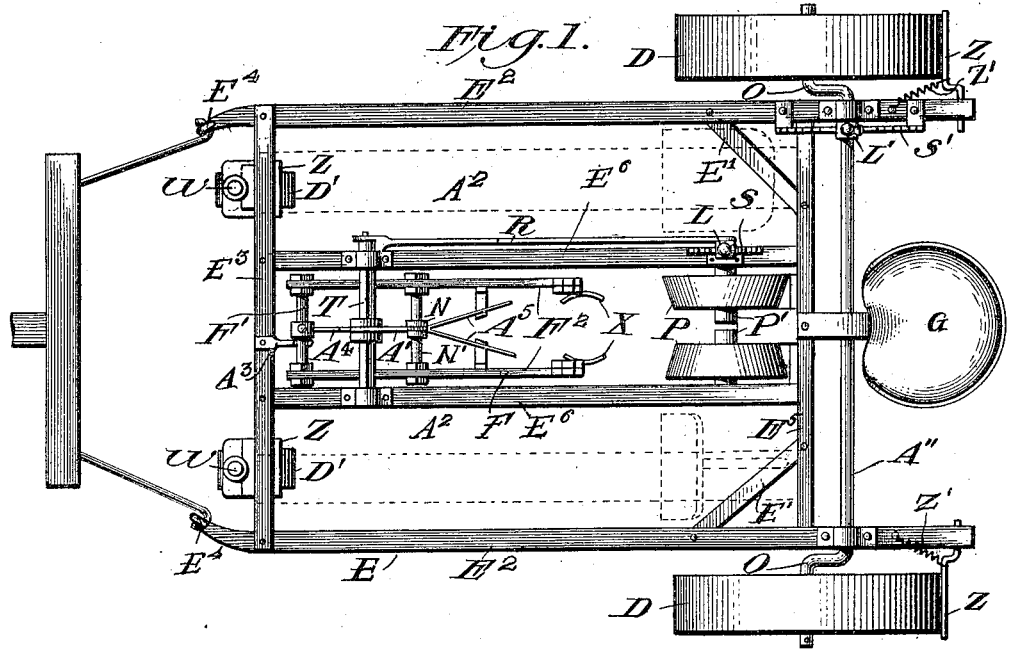
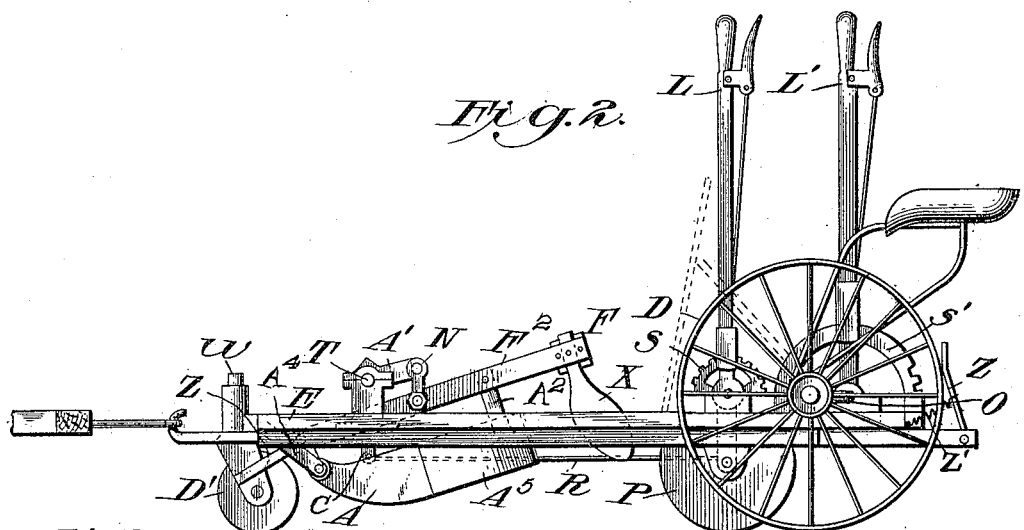

UNITED STATES PATENT OFFICE.

BERNARD WIELER, ANTON BEULIGMANN, AND JOSEPH AYRES, OF MOUNT CARMEL, ILLINOIS.

TRANSPLANTER.

981,509.   Specification of Letters Patent.   Patented Jan. 10, 1911.

Application filed April 9, 1909. Serial No. 489,018.

*To all whom it may concern:*

Be it known that we, BERNARD WIELER, ANTON BEULIGMANN, and JOSEPH AYRES, citizens of the United States of America, and residents of Mount Carmel, in the county of Wabash and State of Illinois, have invented certain new and useful Improvements in Transplanters, of which the following is a specification.

This invention relates to transplanters and is designed as an improvement on the machine shown and described in Patent No. 540171 dated May 28, 1895 and issued to L. Lambeth & S. Boone.

The object of the invention is to provide a simple, efficient and inexpensive machine for opening a furrow, setting plants at intervals, covering or hilling and rolling the earth at opposite sides of the line of plants to settle it firmly around the roots.

Another object is to provide pressure or rolling wheels which may be arranged straight and are provided with beveled faces for pressing the ground around the plants; also to provide improved means for raising and lowering the frame which holds the furrow opener, shovels and pressure wheels.

With these and other objects in view, the invention consists of certain novel features of construction, combination and arrangement of parts as will be more fully described and particularly pointed out in the appended claims.

In the accompanying drawings; Figure 1 is a top plan view of this improved transplanter. Fig. 2 is a side elevation thereof.

In the embodiment illustrated a substantially rectangular main frame E is shown preferably composed of angle iron with the rear corners thereof preferably braced by diagonally disposed bars E' and with the front ends of the side members $E^2$ thereof projecting beyond the front cross bar $E^3$ and curved inwardly and provided with attaching eyes $E^4$ for the connection of the draft mechanism. This frame E is preferably supported on large rear wheels D and on small front wheels D'; the latter being arranged to follow in the line of the pull whether straight or to turn the machine. The center of each wheel D' is offset from the center of its pivot W as shown.

The rear wheels D are revolubly mounted on the ends O of the crank axle A'' which is mounted in bearings on the rear ends of the side bars $E^2$ which extend beyond the rear cross bar $E^5$ of the frame E. Scrapers Z of the wheels D are preferably mounted on the rearwardly extending ends of the side bars $E^2$ and are yieldably held in engagement with the tires of the wheels by coiled springs Z' secured at one end to the scrapers Z and at their other end to the side bars $E^2$.

Two laterally spaced pressure wheels as P are revolubly mounted on stub shafts as P' carried by and extending inwardly from the rear portion of two laterally spaced longitudinally extending bars $E^6$ arranged between the side bars $E^2$ and connected at their opposite ends to the front and rear cross bars $E^3$ and $E^5$. These stub shafts are mounted in bearings on the bars $E^6$ which are raised and lowered as hereinafter described. The peripheries of these wheels P are beveled laterally inward toward each other as shown in Fig. 1 and are spaced a sufficient distance apart to permit them to pass on opposite sides of the plants (not shown) and press the earth thrown up by the shovels X firmly against the roots of the plants in hill-like form.

A frame F is pivotally mounted at the front end of the main frame E and preferably comprises two bars $F^2$ connected at one end to a rod F' which is revolubly mounted in a bracket $A^3$ fixed to the cross bar $E^3$ of the main frame. Shovels as X are secured to the free ends of the bars $F^2$ and are adapted to be raised and lowered thereby.

A substantially Y shaped furrow opener A is arranged horizontally and has the free end of the stem thereof connected with the front end of the frame F, preferably by means of a link $A^4$. The diverging arms $A^5$ of said opener are connected with the bars $F^2$ by suitable straps $A^2$ whereby said opener is raised and lowered with the said frame F which is operatively connected with a lever L mounted on one of the bars $E^6$ adjacent the driver's seat by a rod R. This lever L is provided with the usual spring dog or ratchet for engaging a toothed segment S for holding said frame F in adjusted position.

A shaft T is revolubly mounted in suitable bearings on the front ends of the bars $E^6$ with one end of which the rod R is connected by means of a crank arm C the body portion of this shaft is angular in cross section and an arm A' is rigidly connected at one end therewith and pivotally connected at its other end with one end of a link N. The other end of the link N is pivotally connected with a rod N' which connects the bars F² of the frame F. It will thus be obvious that when the lever L is moved forward or backward the frame F is raised or lowered respectively.

Arranged between the bars E⁶ and the side bars E² are platforms having seats thereon for the plant setters, as shown in dotted lines in Fig. 1 the back of one seat being shown folded down and the other open.

A lever L' is fixed to the arched portion of the rear axle A'' and is provided with a spring dog which engages the teeth of a segmental rack S' secured to one of the side bars E². The wheels D being mounted on crank ends O of the axle causes the main frame E to be raised or lowered on the moving of the lever L' in the proper direction, the wheels D serving as a fulcrum. This raising or lowering of frame E raises or lowers the pressure wheels P into the desired position.

We claim as our invention:

In a transplanter, a wheel supported main frame, an auxiliary frame pivotally mounted at one end near the front of said main frame, shovels on the free end of said auxiliary frame, a furrow opener arranged longitudinally in said auxiliary frame and extending therebelow in advance of said shovels, laterally spaced bearings on said main frame arranged in a plane above said auxiliary frame, a shaft revolubly mounted in said bearings and having a crank arm at one end thereof, an arm fixed to said shaft and extending in a plane at an angle to said crank arm, a link pivotally connected with the free end of said arm and with said auxiliary frame, an operating lever fulcrumed on said main frame, means for holding said lever in adjusted position, and a rod on said lever and said crank arm.

BEN WIELER.
ANTON BEULIGMANN.
JOSEPH AYRES.

Witnesses:
H. M. PHIPPS,
FRED STUERZENBERGER.